United States Patent [19]

Watanabe et al.

[11] 3,894,913

[45] July 15, 1975

[54] METHOD FOR PRODUCTION OF α-GALACTOSIDASE

[75] Inventors: Masayuki Watanabe; Shigeyoshi Narita; Itiro Kagaya; Minoru Miura; Yasunobu Suzuki; Shuji Tanaka; Masami Sasaki; Shogo Miyatani; Kenichi Terayama, all of Kitami, Japan

[73] Assignee: Hokkaido Sugar Co., Ltd., Tokyo, Japan

[22] Filed: Jan. 28, 1974

[21] Appl. No.: 437,535

[52] U.S. Cl. .................................. 195/65; 195/114
[51] Int. Cl. ............................................. C12d 13/10
[58] Field of Search ............... 195/65, 66 R, 114, 11

[56] References Cited
UNITED STATES PATENTS 3,795,585   3/1974   Suzuki et al. ...................... 195/65

Primary Examiner—Lionel M. Shapiro
Attorney, Agent, or Firm—Kurt Kelman

[57] ABSTRACT

In culturing an α-galactosidase-producing mold in a known medium, addition of organic acids such as citric acid, lactic acid and glycolic acid to the medium strikingly enhances the α-galactosidase activity of the enzyme to be consequently produced. When the enzyme is used for the purpose of hydrolyzing the raffinose contained in the beet molasses-including syrup or juice in the process of beet sugar production, the enhanced α-galactosidase activity serves to decrease the amount of enzyme required and facilitate the enzyme handling.

3 Claims, No Drawings

METHOD FOR PRODUCTION OF α-GALACTOSIDASE

BACKGROUND OF THE INVENTION

This invention relates to a method for the production of α-galactosidase by the culture of a mold. More particularly, the present invention relates to a method for the production of α-galactosidase by the culture of a mold, the α-galactosidase activity of said enzyme being strikingly enhanced by adding certain types of organic acids to the medium in which the culture is carried out. α-Galactosidase has heretofore been known as an enzyme capable of hydrolyzing raffinose into sucrose and galactose and it is extensively utilized in beet sugar production. In addition, it is widely used as a reagent for the determination of raffinose contents and as a reagent for the determination of chemical structures of compounds. When the α-galactosidase is used for the purposes mentioned above, the enzyme is desired to have strong α-galactosidase activity but to be weak in the invertase activity which is simultaneously manifested. As a mold productive of an enzyme combining strong α-galactosidase activity with weak invertase activity, there has heretofore been known *Mortierella vinacea* var. raffinoseutilizer (ATCC 20034) (U.S. Pat. No. 3,647,625). Other molds which have a similar behavior include type strains belonging to the genus of Absidia such as, for example, *Absidia lichtheimi* (Lucet et Costantin) Lendner (IFO 4009), *Absidia lichtheimi* (Lucet et Costantin) Lendner (IFO 4010), and *Absidia reflexa* van Tieghem (IFO 5874), type strains belonging to the genus of Circinella such as, for example, *Circinella muscae* (Sorokine) Berlese et de Toni (*Circinella sydowi* Lendner) (IFO 4457) and *Circinella mucoroides* Saito (*Circinella chinensis* Naganishi et Kojiro) (IFO 4453), and *Circinella muscae* (Berlese et de Toni) nova typica coreanus (ATCC 20394) which has recently been discovered by one of the present inventors.

SUMMARY OF THE INVENTION

It is an object of this invention to provide, in the production of α-galactosidase by the culture of a mold, a method for strikingly enhancing the α-galactosidase activity of the enzyme to be produced within the mycelia of said mold.

To accomplish the object described above, the method according to the present invention causes a medium used for culturing an α-galactosidase-producing mold to incorporate therein 0.2 to 1.0 percent, based on the medium, of organic acids such as citric acid, lactic acid and glycolic acid. The α-galactosidase activity of the enzyme to be consequently produced can be strikingly enhanced by thus adding said organic acids, as promoters, to the known medium. For the use to which this enzyme is put, the enhanced α-galactosidase activity proves highly advantageous since it leads to decreasing the amount of enzyme required and also to facilitating the enzyme handling in the reaction involved.

Other objects and characteristics of the present invention will become apparent from the detailed description of the invention and the preferred embodiments to be given herein below.

DETAILED DESCRIPTION OF THE INVENTION

In connection with the production of α-galactosidase by the culture of known molds, the inventors pursued various avenues of research after a possible measure for enhancing the α-galactosidase activity of the enzymes to be produced within the mycelia of said molds. Consequently, they have discovered that the α-galactosidase activity of the enzymes is strikingly enhanced and the invertase activity thereof is hardly increased by adding to the known medium such organic acids as citric acid, lactic acid and glycolic acid.

Although the method of this invention can be applied to all the α-galactosidase-producing molds without exception, it is particularly effective on molds of the genus Absidia and the genus Circinella. As type strains of the genus Absidia on which the present invention is effective, there can be cited *Absidia lichtheimi* (Lucet et Costantin) Lendner (IFO 4009), *Absidia reflexa* van Tieghem (IFO 5874), *Absidia hyalospora* (Saito) Lendner (IFO 8082), *Absidia ramosa* (Vuillemin) Lendner (IFO 8083) and *Absidia regnieri* (Lucet et Costantin) Lendner (IFO 8084), for example. Examples of type strains of the genus Circinella on which this invention is effective include *Circinella muscae* (Sorokine) Berlese et de Toni (C. W. Hesseltine) (IFO 6410), *Circinella muscae* (Sorokine) Berlese et de Toni (*Circinella lydowi* Lendner) (IFO 4457), *Circinella mucoroides* Saito (*Circinella chinensis* Naganishi et Kojiro) (IFO 4453) and *Circinella mucoroides* Saito (K. Saito) (IFO 4455). Further, *Circinella muscae* (Berlese et de Toni) nova typica coreanus (ATCC 20394), a newly discovered mold deposited at ATCC on Jan. 7, 1974 can likewise be used. This novel mold has been isolated from A Korean yeast cake by one of the present inventors. Although the attributes of this mold are well in arrangement with those of *Circinella muscae* (Sorokine) Berlese et de Toni described in the report of C. W. Hesseltine and Dorothy I. Fennel (The genus Circinella, Mycologia Vol. XLVII, No. 2, 193–212, March–April, 1955), a difference is recognized in terms of appearance and color tone of the microorganic flora in the initial stage of culture. In addition, these two molds clearly differ in physiological properties, particularly, α-galactosidase producing ability. As a new type of the species Circinella muscae, the mold of the invention has been designated "Circinella muscae (Berlese et de Toni) nova typica coreanus." The mycological characteristics of this mold are as follows:

A microscopic observation reveals that the sporangiophores grown on the Synthetic Mucor Agar medium assume a light brown color and produce sympodial branches as they get old. Their forward ends invariably form circinate coils downwardly, with a single sporangium borne at the extremity of each coil. Occasionally, sterile spines branch off near sporangia and they are separated by septa. Main sporangiophores and branched sporangiaphores are slightly different in size from each other, the former measuring 8 to 10 microns and the latter 4 to 6 microns respectively in diameter. Sporangia have a spherical form or a slightly pressed pseudospherical form and measure 30 to 65 microns in diameter. At first, they are white and gradually assume a dark gray color as they mature. They are observed to vary in diameter; small ones measure about 20 microns and large ones are found to reach as much as 80 microns. The wall surfaces of sporangia are slightly coarse and broken and frequently retain dished collars in the lower portion of columella.

Columella measure 10 to 30 by 30 to 40 microns on the average and occur in various forms such as oval, conical, pear-shaped and rectangular form. Some have a smooth surface and others have an indefinite number of protuberances at the top. They assume a light gray color.

Sporangiosphores have a spherical to pseudospherical form with a smooth surface and measure 4 to 6 microns in diameter. They appear practically colorless when they are observed individually. When in the form of a cluster, however, they appear to have a dark gray to black color. Growth of chlamidospores or zygosphores is observed.

Macroscopic observation reveals that the mycelium grown on synthetic mucor agar medium, potato dertrose agar medium and malt extract agar medium at first presents a felt-like appearance which changes in color from white to dark gray or black as the sporangia mature. The top of old cultures is covered by light brown sporangiophores having a dirty appearance. This is caused by growth of the light brown sporangiophores which reach 5 to 7 mm. There is no production of soluble pigment in the medium.

The medium to be used for the method of this invention is prepared by combining carbon sources, nitrogen sources and inorganic salts which are usually employed in culturing molds and further incorporating therein such inducers as lactose, galactose, raffinose and melibiose.

As carbon sources usable for this purpose, there can be cited starch, glucose, glycerine, maltose, dextrine, sucrose and invert molasses. Examples of nitrogen sources include soybean flour, peanut powder, ground cottonseed, corn steep liquor, meat extract, peptone, yeast extract, nitrates and ammonium salts. Inorganic salts usable for the medium include common salt, potassium chloride, magnesium sulfate, manganese sulfate, iron sulfate, phosphates and calcium carbonate, for example. If occasion demands, vitamins may be incorporated.

According to the method of this invention, organic acids are added as growth promoters for $\alpha$-galactosidase to the basal medium which is prepared of the foregoing essential components. Desirably, the amount of such organic acids to be added falls in a range of between 0.2 and 1.0 percent based on the basal medium. The enhancement of the $\alpha$-galactosidase activity which the present invention aims to achieve in the produced enzyme is not obtained when the amount of added organic acids falls outside the range mentioned above. As organic acids which are usable for incorporation to the basal medium, there may be cited citric acid, lactic acid, glycolic acid, fumaric acid, glutaric acid, malic acid, galacturonic acid, tartaric acid, succinic acid and pyruvic acid. In consideration of economy and enhancement of $\alpha$-galactosidase activity, however, citric acid, lactic acid and glycolic acid prove to be most practical for the purpose.

The mold inoculated to the medium incorporating such promoting substances can be aerobically cultured by an ordinary method in its unmodified form. To be specific, the mold is inoculated to a medium prepared by adding a prescribed amount of $\alpha$-galactosidase growth promoters to a basal medium formed of suitable carbon sources, nitrogen sources, inorganic salts and inducers and subjecting it to shaken culture or aerated culture at about 30°C for 40 to 72 hours, with the pH value maintained in a range between 5 and 8. The culture liquid consequently obtained is separated by a known method into a liquid portion and a mycelial mass. After the mycelial mass is washed with water, it can be added in its unaltered form to beet molasses so that the enzyme contained therein may act on and hydrolyze the raffinose contained in the beet molasses. The mycelial mass which has been washed with water may be treated by a suitable known method so as to be put to a desired application.

As is clear from the foregoing explanation, the method of the present invention can increase the total amount of $\alpha$-galactosidase produced by the mold by merely adding organic acids to the medium conventionally employed for culturing molds. Since the produced enzyme shows highly enhanced $\alpha$-galactosidase activity per weight of enzyme and substantially no increase in invertase activity, it has the economic advantage that the concentration adjustment of the beet molasses to be treated can be accomplished easily and the amount of enzyme required for the treatment can be decreased.

Now, the preferred embodiments of the present invention and comparative examples will be cited herein below. It should be understood, however, that the present invention is not limited to the preferred embodiments in any way.

EXAMPLE 1

A basal medium was prepared by using 1.0 percent of lactose, 1.0 percent of glucose, 1.0 percent of corn steep liquor, 0.6 percent of $(NH_4)_2SO_4$, 0.3 percent of $KH_2PO_4$, 0.2 percent of $MgSO_4.7H_2O$ and 0.2 percent of NaCl. The basal medium was divided into nine portions and one of the organic acids listed in Table 1 was dissolved in each portion in an amount of 0.7 percent. Then, the medium of each portion was adjusted to pH 5.0 and 0.3 percent of $CaCO_3$ was added thereto. To 200-ml of each portion of the medium thus prepared, *Absidia hyalospora* (Saito) Lendner (IFO 8082) in the form of spore suspension was inoculated in an amount to give a count of $1 \times 10^6$ spores per cc of medium and shaken cultured at 30°C for 48 hours, with the agitation performed at a rate of 136 r.p.m. The results were as shown in Table 1.

By way of comparison, the culture was performed by following the procedure described above, except for addition of organic acids. The results are indicated in Table 1.

Referring to the date shown in table, the values of $\alpha$-galactosidase activity are those determined by adding 1 ml of mycelia suspension under test to a mixture of 0.5 ml of 0.06M melibiose and 0.5 ml of 0.1M phosphate buffer solution (pH 5.2) to permit reaction to ensue at 40°C for 2 hours, thereafter heating the reaction mixture in a boiling water bath for 5 minutes to inactivate the enzyme, then adding 1 ml of 1.8% Ba-$(OH)_2.8H_2O$ and 1 ml of 2% $ZnSO_4.7H_2O$ to the reaction solution to deprive the solution of protein, centrifuging the resultant mixture and assaying the resultant protein-free supernatant for glucose content by the glucostat process. In consideration of the fact that the amount of glucose liberated from melibiose and the enzyme concentration are in a proportional relationship up to 1,000 $\mu g$ of glucose, the suspension was diluted in advance so that it would fall in the measuring range satisfying this relationship. The amount of free glucose was multiplied by the number of dilutions. The $\alpha$-galactosidase activity which liberated 1 $\mu g$ of glucose under the conditions mentioned above was taken as 1 unit. The values of invertase activity are those determined by adding 1 ml of mycelia suspension to a mixture of 0.5 ml of 0.06M sucrose and 0.5 ml of 0.1M phosphate buffer solution (pH 5.0) to permit reaction to ensue under the same conditions as employed for the determination of α-galactosidase activity, centrifuging the resultant reaction solution to remove protein therefrom and assaying the protein-free supernatant for invert sugar content by the Somogyi-Nelson process. The invertase activity which produced 1 μg of invert sugar under the conditions mentioned above was taken as 1 unit.

The dry mycelial weight was found by drying at 105°C that amount of mycelia which has been grown in 100 ml of culture medium and thereafter weighing the dried mass of mycelia.

EXAMPLE 2

A basal medium was prepared by using 1.0 percent of lactose, 1.0 percent of glucose, 0.3 percent of $(NH_4)_2SO_4$, 0.5 percent of yeast extract, 0.5 percent of peptone, 0.2 percent of $K_2HPO_4$, 0.05 percent of $MgSO_4 \cdot 7H_2O$, 0.002 percent of $MnSO_4 \cdot 4-6H_2O$, 0.001 percent of $F_2SO_4 \cdot 7H_2O$. The basal medium was divided into 10 portions and one of the organic acids listed in Table 2 was dissolved in each portion in an amount of 0.7 percent. Then, the medium of each portion was adjusted to pH 5.8 and 0.3 percent of $CaCO_3$ was added thereto. To 200-ml of each portion of the medium, *Circinella muscae* (Berlese et de Toni) nova typica corcanus (ATCC 20394) in the form of spore suspension was inoculated in an amount to give a count of $1 \times 10^6$ Table 1

| Organic acid | Residual sucrose as glucose (g/100 ml) | Dry weight (g) of mycelium in 100 ml | α-Galactosidase activity | | Invertase activity | |
|---|---|---|---|---|---|---|
| | | | Total act. (μ/ml) | Spec. act. (μ/g on dry basis) | Total act. (μ/ml) | Spec. act. (μ/g on dry basis) |
| Glycolic acid | 0.05 | 1.36 | 185,600 | 1,365×10⁴ | 92 | 6,796 |
| Citric acid | 0.05 | 1.40 | 172,900 | 1,235×10⁴ | 95 | 6,806 |
| Lactic acid | 0.09 | 1.34 | 168,400 | 1,257×10⁴ | 91 | 6,825 |
| Succinic acid | 0.18 | 1.30 | 108,600 | 835×10⁴ | 85 | 6,527 |
| Maleic acid | 0.03 | 1.37 | 103,800 | 758×10⁴ | 89 | 6,509 |
| Fumaric acid | 0.06 | 1.35 | 92,900 | 688×10⁴ | 88 | 6,555 |
| Galacturonic acid | 0.07 | 1.37 | 86,900 | 634×10⁴ | 89 | 6,480 |
| Malic acid | 0.02 | 1.32 | 82,300 | 623×10⁴ | 85 | 6,430 |
| Tartaric acid | 0.02 | 1.33 | 80,100 | 602×10⁴ | 86 | 6,445 |
| Comparative Example (no addition of organic acid) | 0.07 | 1.37 | 64,500 | 471×10⁴ | 88 | 6,427 |

It is clear from the foregoing table that when the culture was made in the presence of glycolic acid, citric acid or lactic acid, the α-galactosidase activity increased by about three times and the invertase activity remained substantially unincreased as compared with the culture performed in the absence of such organic acid.

spores per cc of medium and shaken cultured at 30°C for 48 hours, with the agitation performed at a rate of 136 r.p.m. The results were as shown in Table 2.

By way of comparison, the culture was performed by following the procedure described above, except for addition of organic acids. The results are indicated in Table 2.

Table 2

| Organic acid | Residual sucrose as glucose (g/100 ml) | Dry weight (g) of mycelium in 100 ml | α-Galactosidase activity | | Invertase activity | |
|---|---|---|---|---|---|---|
| | | | Total act. (μ/ml) | Spec. act. (μ/g on dry basis) | Total act. (μ/ml) | Spec. act. (μ/g on dry basis) |
| Citric acid | 0.03 | 1.36 | 404,300 | 2,973×10⁴ | 64 | 4,695 |
| Lactic acid | 0.03 | 1.44 | 389,300 | 2,703×10⁴ | 68 | 4,702 |
| Glycolic acid | 0.03 | 1.50 | 385,600 | 2,571×10⁴ | 72 | 4,811 |
| Fumaric acid | 0.03 | 1.24 | 325,700 | 2,627×10⁴ | 57 | 4,600 |
| Glutaric acid | 0.03 | 1.51 | 321,600 | 2,130×10⁴ | 73 | 4,850 |
| Malic acid | 0.03 | 1.25 | 306,000 | 2,448×10⁴ | 61 | 4,905 |
| Galacturonic acid | 0.03 | 1.33 | 295,400 | 2,221×10⁴ | 62 | 4,670 |
| Tartaric acid | 0.03 | 1.42 | 275,600 | 1,941×10⁴ | 63 | 4,450 |
| Succinic acid | 0.03 | 1.28 | 256,500 | 2,004×10⁴ | 63 | 4,920 |
| Pyruvic acid | 0.03 | 1.48 | 231,100 | 1,561×10⁴ | 73 | 4,920 |
| Comparative Example (no addition of organic acid) | 0.03 | 1.45 | 175,000 | 1,207×10⁴ | 65 | 4,502 |

EXAMPLE 3

The media were prepared by repeating the procedure of Example 1, except that the amounts (0.7 percent) of glycolic acid, citric acid and lactic acid shown in Table 1 were changed respectively to 0.3 percent, 0.5 percent, 0.7 percent and 1.0 percent. To the media, *Absidia hyalospora* (Saito) Lendner (IFO 8082) was inoculated and cultured. The results were as shown in Table 3. By way of comparison, the culture was performed in the absence of organic acids. The results are indicated in Table 3.

It is clear from the foregoing table that the α-galactosidase activity was highest when the amount of an organic acid added was in the neighborhood of 0.7 percent and that said activity declined when the amount increased or decreased from said level.

EXAMPLE 4

The media were prepared by repeating the procedure of Example 2, except that the amounts (0.7 percent) of citric acid, lactic acid and glycolic acid shown in Table 2 were changed respectively to 0.2 percent, 0.4 percent, 0.6 percent, 0.8 percent and 1.0 percent. To the media, *Circinella muscae* (Berlese et de Toni) nova typica coreanus (ATCC 20394) was inoculated and cultured. The results were as shown in Table 4.

Table 3

| Organic acid | Amount added (%) | R.S. as glucose g/100 ml | Dry weight (g) of mycelium in 100 ml | α-Galactosidase activity Total act. ($\mu$/ml) | α-Galactosidase activity Spec. act. ($\mu$/g on dry basis) | Invertase activity Total act. ($\mu$/ml) | Invertase activity Spec. act. ($\mu$/g on dry basis) |
|---|---|---|---|---|---|---|---|
| Glycolic acid | 0.3 | 0.03 | 1.30 | 115,900 | $892 \times 10^4$ | 90 | 6,923 |
| | 0.5 | 0.02 | 1.34 | 160,800 | $1,200 \times 10^4$ | 91 | 6,791 |
| | 0.7 | 0.04 | 1.36 | 175,600 | $1,291 \times 10^4$ | 92 | 6,765 |
| | 1.0 | 0.03 | 1.35 | 157,200 | $1,164 \times 10^4$ | 92 | 6,815 |
| Citric acid | 0.3 | 0.03 | 1.38 | 140,200 | $1,016 \times 10^4$ | 91 | 6,594 |
| | 0.5 | 0.03 | 1.38 | 156,300 | $1,133 \times 10^4$ | 94 | 6,812 |
| | 0.7 | 0.04 | 1.41 | 171,000 | $1,213 \times 10^4$ | 94 | 6,667 |
| | 1.0 | 0.04 | 1.40 | 151,700 | $1,084 \times 10^4$ | 93 | 6,643 |
| Lactic acid | 0.3 | 0.02 | 1.35 | 164,500 | $1,219 \times 10^4$ | 88 | 6,519 |
| | 0.5 | 0.02 | 1.36 | 183,800 | $1,351 \times 10^4$ | 91 | 6,691 |
| | 0.7 | 0.03 | 1.36 | 188,400 | $1,385 \times 10^4$ | 92 | 6,765 |
| | 1.0 | 0.06 | 1.36 | 179,900 | $1,323 \times 10^4$ | 91 | 6,691 |
| Comparative Example (no addition of organic acid) | | 0.02 | 1.34 | 65,300 | $487 \times 10^4$ | 89 | 6,642 |

Table 4

| Organic acid | Amount added (%) | R.S. as glucose g/100 ml | Dry weight (g) of mycelium in 100 ml | α-Galactosidase activity Total act. ($\mu$/ml) | α-Galactosidase activity Spec. act. ($\mu$/g on dry basis) | Invertase activity Total act. ($\mu$/ml) | Invertase activity Spec. act. ($\mu$/g on dry basis) |
|---|---|---|---|---|---|---|---|
| Citric acid | 0.2 | 0.04 | 1.42 | 268,100 | $1,888 \times 10^4$ | 63 | 4,437 |
| | 0.4 | 0.03 | 1.41 | 320,900 | $2,276 \times 10^4$ | 63 | 4,468 |
| | 0.6 | 0.03 | 1.45 | 407,100 | $2,808 \times 10^4$ | 66 | 4,552 |
| | 0.8 | 0.04 | 1.47 | 384,200 | $2,614 \times 10^4$ | 66 | 4,490 |
| | 1.0 | 0.03 | 1.40 | 345,400 | $2,467 \times 10^4$ | 64 | 4,571 |
| Lactic acid | 0.2 | 0.03 | 1.43 | 242,800 | $1,698 \times 10^4$ | 64 | 4,476 |
| | 0.4 | 0.03 | 1.45 | 311,300 | $2,147 \times 10^4$ | 66 | 4,552 |
| | 0.6 | 0.03 | 1.52 | 405,400 | $2,667 \times 10^4$ | 68 | 4,474 |
| | 0.8 | 0.03 | 1.50 | 353,500 | $2,357 \times 10^4$ | 67 | 4,467 |
| | 1.0 | 0.03 | 1.41 | 300,000 | $2,128 \times 10^4$ | 64 | 4,539 |
| Glycolic acid | 0.2 | 0.04 | 1.43 | 248,200 | $1,736 \times 10^4$ | 68 | 4,755 |
| | 0.4 | 0.04 | 1.46 | 341,300 | $2,338 \times 10^4$ | 72 | 4,932 |
| | 0.6 | 0.03 | 1.45 | 397,600 | $2,742 \times 10^4$ | 74 | 5,103 |
| | 0.8 | 0.03 | 1.46 | 366,200 | $2,508 \times 10^4$ | 73 | 5,000 |
| | 1.0 | 0.04 | 1.44 | 319,800 | $2,221 \times 10^4$ | 70 | 4,861 |
| Comparative Example (no addition of organic acid) | | 0.03 | 1.41 | 176,200 | $1,250 \times 10^4$ | 63 | 4,468 |

EXAMPLE 5

To the media prepared by the procedure of Example 2, various type strains of the genus of Circinella and the genus of Absidia were inoculated and cultured under the same conditions as described in Example 2. The results are shown in Table 5 (in the rows indicated by the "o" mark). By way of comparison, the culture was performed in the absence of citric acid. The results are likewise shown in Table 5 (in the rows indicated by the "x" mark).

Table 5

| | Citric acid used (o) or not used (x) | Dry weight (g) of mycelium in 100 ml | α-Galactosidase activity | | Invertase activity | |
|---|---|---|---|---|---|---|
| | | | Total act. ($\mu$/ml) | Spec. act. ($\mu$/g on dry basis) | Total act. ($\mu$/ml) | Spec. act. ($\mu$/g on dry basis) |
| Circinella muscae (Sorokine) Berlese et de Toni (C.W. Hesseltine) (IFO 6410) | x | 1.36 | 43,200 | $318 \times 10^4$ | 120 | 8,823 |
| | o | 1.38 | 154,000 | $1,116 \times 10^4$ | 123 | 8,913 |
| Circinella muscae (Sorokine) Berlese et de Toni (Circinella sydowi Lendner) (IFO 4457) | x | 1.40 | 71,000 | $507 \times 10^4$ | 94 | 6,714 |
| | o | 1.41 | 173,500 | $1,230 \times 10^4$ | 98 | 6,950 |
| Circinella mucoroides (Saito) (Circinella chinensis Naganishi et Kojiro) (IFO 4453) | x | 1.37 | 109,500 | $799 \times 10^4$ | 92 | 6,715 |
| | o | 1.37 | 232,000 | $1,693 \times 10^4$ | 99 | 7,226 |
| Circinella mucoroides Saito (K. Saito) (IFO 4455) | x | 1.35 | 102,400 | $759 \times 10^4$ | 94 | 6,963 |
| | o | 1.38 | 221,600 | $1,606 \times 10^4$ | 99 | 7,174 |
| Absidia reflexa van Tieghem (IFO 5874) | x | 1.42 | 72,500 | $511 \times 10^4$ | 109 | 7,676 |
| | o | 1.43 | 140,500 | $983 \times 10^4$ | 119 | 8,322 |
| Absidia regnieri (Lucet et Costantin) Lendner (IFO 8084) | x | 1.35 | 70,000 | $519 \times 10^4$ | 108 | 8,000 |
| | o | 1.37 | 161,700 | $1,180 \times 10^4$ | 120 | 8,759 |
| Absidia lichtheimi (Lucet et Costantin Lendner (IFO 4010) | x | 1.40 | 101,500 | $725 \times 10^4$ | 121 | 8,643 |
| | o | 1.42 | 208,600 | $1,469 \times 10^4$ | 150 | 10,563 |
| Absidia lichtheimi (Lucet et Costantin) Lendner (IFO 4009) | x | 1.40 | 93,600 | $669 \times 10^4$ | 120 | 8,571 |
| | o | 1.41 | 206,000 | $1,461 \times 10^4$ | 151 | 10,709 |
| Absidia ramosa (Vuillemin) Lendner (IFO 8083) | x | 1.32 | 52,300 | $396 \times 10^4$ | 106 | 8,030 |
| | o | 1.31 | 135,200 | $1,032 \times 10^4$ | 127 | 9,695 |

It is clear from the foregoing table that the α-galactosidase activity increased by at least two times in the culture performed in the presence of 0.7 percent of citric acid.

We claim:
1. A method for the production of α-galactosidase by the culture of a mold, belonging to the genus of Circinella or Absidia which comprises adding to a basal medium about 0.2 percent to about 1.0 percent, based on said basal medium, of an organic acid selected from the group consisting of citric acid, lactic acid, glycolic acid, fumaric acid, glutaric acid, malic acid, galacturonic acid, tartaric acid, succinic acid and pyruvic acid, and culturing the mold in said prepared medium under conditions enabling the mold to produce α-galactosidase.

2. A method according to claim 1, wherein the mold is a species belonging to the genus of Circinella.

3. A method according to claim 1, wherein the mold is a species belonging to the genus of Absidia.

* * * * *